United States Patent
Powell, II et al.

[11] Patent Number: 6,101,700
[45] Date of Patent: Aug. 15, 2000

[54] METHOD FOR MANUFACTURING LAMINATED PART USING A DIE CONTAINED SENSING PROBE

[75] Inventors: John F. Powell, II, County of Westmoreland; William Burdett, County of Armstrong; Samuel A. Rummel, County of Butler, all of Pa.

[73] Assignee: Oberg Industries, Inc., Freeport, Pa.

[21] Appl. No.: 09/222,208

[22] Filed: Dec. 29, 1998

Related U.S. Application Data

[60] Provisional application No. 60/070,314, Jan. 2, 1998.

[51] Int. Cl.[7] .................................................. B23Q 17/00
[52] U.S. Cl. ................................... 29/407.01; 29/407.01; 29/714; 29/736; 29/609; 33/504; 33/554
[58] Field of Search ................................ 29/407.01, 596, 29/593, 33 L, 564, 714, 736, 609, 598; 33/504, 554

[56] References Cited

U.S. PATENT DOCUMENTS

5,095,638   3/1992   David et al. .............................. 33/783

Primary Examiner—P. W. Echols
Assistant Examiner—John C. Hong
Attorney, Agent, or Firm—Buchanan Ingersoll, P.C.

[57] ABSTRACT

An apparatus and method for manufacturing laminated parts from a plurality of laminas, in which the laminas for forming the laminated parts are blanked from strip stock material. The laminas and are then cut and stacked to form the laminated part. The apparatus includes a measuring device placed with the die element of the press, for accurately measuring the thickness of successive sections of the strip stock. A controller, such as a computer or a programmable logic controller, receives the thickness value of the strip stock sections from the measuring device. Means are also included which is activated by the controller to provide a compensation adjustment at selected locations upon the strip stock sections to counteract the measured thickness variations, and to control the stack height.

3 Claims, 7 Drawing Sheets

METHOD FOR MANUFACTURING LAMINATED PART USING A DIE CONTAINED SENSING PROBE

CROSS REFERENCE TO RELATED APPLICATION

This application is based on provisional patent application Ser. No. 60/070,314, filed Jan. 2, 1998.

BACKGROUND OF THE INVENTION

1. Field of the Invention

The present invention relates generally to an apparatus and method for measuring the thickness of the material used in a stamping or forming process, and more particularly to such an apparatus measuring the material thickness while contained within the stamping die.

2. Description of the Prior Art

In manufacturing stamped metal products, there are certain applications where knowing the material thickness as exactly as possible at the time of stamping is desirable. Some applications are products where the material thickness becomes a critical dimension, or where metal displacement in a coining operation is critical. A stack of laminations is one example of the first category; the space between the coined tips of the leads in a lead frame is an example of the second. There are also applications where the difference in material thickness from one side of the strip to the other can affect the end product.

Figures 1A, 1B:
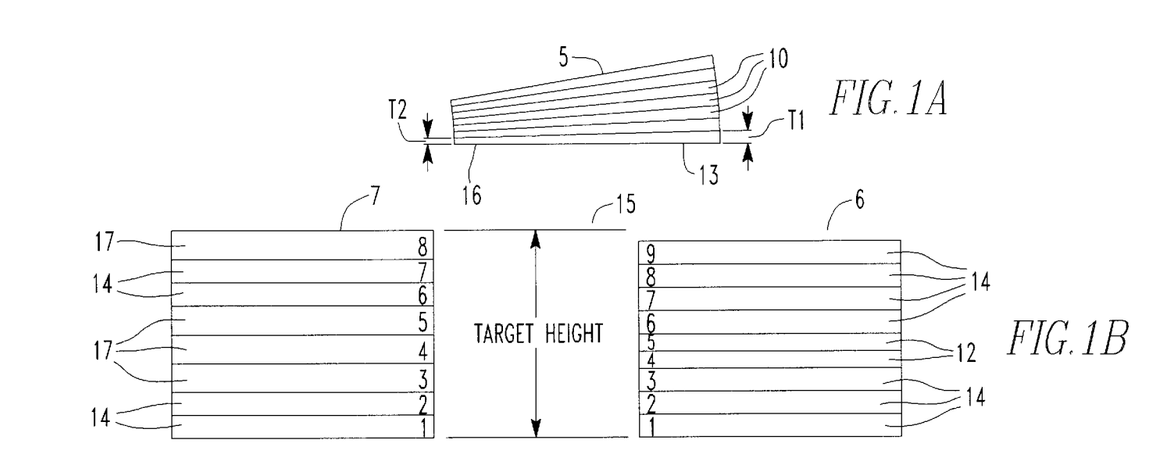

The stacking of a series of laminations is often used, for example, in the manufacture of elements of electric motors, solenoids, transformers and the like. Typically, the individual laminas are blanked from continuous strip stock and then stacked and bound together to form the part being manufactured. However, due to imperfections of the strip stock, thickness variations often occur and may thus cause the part being formed from successive layers of the laminas to incur parallelism error (i.e., "leaning"). This parallelism error occurs because in stacking the laminas, the relatively thicker portions of the individual laminas are directly overlaying one another, and the relatively thinner portions of the laminas directly overlie one another. Parallelism error is depicted in prior art FIG. 1A. During the stacking of the individual laminations 10, one side 13 of the stack becomes higher than the opposite side 16 of the stack, which in turn results in a leaning or bending of the stack.

Techniques have been developed in the industry for attempting to overcome this leaning condition of the stack. For example, it is known in the industry to rotate the stack for symmetrical laminas so that the relatively thicker portion of each lamina does not directly overlie or underlie the relatively thicker portion of adjacent laminas. Typically the stack is rotated 180° prior to the laying of each lamina. Of course, instead of rotating the stack, each lamina may be rotated while the position of the stack is kept constant to achieve the same result. U.S. Pat. No. 4,619,028 to Neuenschwander describes this type of solution to the problem associated with parallelism error.

Another problem well known in the industry is the inaccuracies of the thickness of the sheet material, commonly made of steel, used to make the individual laminas. Normal small variations in the thickness of the individual lamina will be added as a function of the number of laminations in the stack, to the point of requiring the increase or decrease in the number of laminations in the stack to remain as near to the target height as possible. An example of a stack of lamina generated by stacking individual lamina of varying thickness is depicted in prior art FIG. 1B. A predetermined target height 15 is programmed into the die controller which is known in the industry. Stack 6 consisting of nine (9) lamina is generated using lamina thickness of nominal thickness 14 and less than nominal thickness 12. This stack was slightly below the target height 15 since one additional lamina would exceed the target height 15. Stack 7 consisting of eight (8) lamina is generated in a similar fashion as stack 6 using nominal lamina thickness 14 and thicker lamina thickness 17. In either case, although the actual stack height may fall within an acceptable tolerance for the target height whether slightly larger or smaller than the target, such an occurrence cannot be determined until the stack is essentially completed and its height measured according to conventional techniques. Adding the capability to measure lamina thickness and adding a means to calculate the actual height of a stack being generated provides a means to generate a stack within a target range independent of the number of lamina need not achieve this target height. Since the stack height can be adjusted only by adding or removing laminations, this results in the stack of laminations having a height that will vary from a target height, despite either manually or automatically varying the number of laminations in the stack. Lamination stacks are commonly assembled either in the stamping die by interlocking the laminations together and also external to the die in machines made for this purpose.

A method to overcome both parallelism error and variation in material thickness is described in co-pending application Ser. No. 08/782,985, filed on Jan. 4, 1997 and its continuation-in-part application Ser. No. 08/852,017, filed on May 6, 1997, both of which are assigned to the present assignee and hereby incorporated by reference herein in this application. Briefly, these applications disclose the use of dimples on protuberances selectively formed into certain laminations. The dimples are preferably of a predetermined height and provide a means for compensation for the thickness variations of the strip stock material, obviating parallelism error and/or manufacturing a stack of laminations as near as possible to the desired height. A method using lamination rotation to overcome parallelism error can also be found in U.S. Pat. No. 5,377,115.

With either of these solutions for overcoming strip stock material thickness variations, the precise measurement of the material thickness is a critical factor. In the examples set forth previously, the effect of a thickness change is greatly magnified so extreme accuracy is required in the measuring method to both measure the variation as well as in devising the proper means of compensating for that variation. At the same time, the environment of a stamping press is relatively harsh, subjecting the measuring device to the adverse effects of high vibration (i.e., greater than 50 g force and/or 2500 Hertz), lubricant contamination, and physical damage.

Methods and apparatus are needed to accurately measure the strip stock, and hence individual lamina thickness, variations during the fabrication of structures by the stacking of laminations. Such methods and apparatus should be capable of being utilized in the harsh environment of a typical press.

It is therefore an object of the present invention to provide a method of accurately measuring the strip stock thickness during the metal stamping process.

It is a further object of the present invention to provide a lamination stamping die which contains the measuring device to measure material variations during the stamping process.

It is another object of the present invention to provide a material thickness measurement device integral to the die which provides an input to a die controller which automatically determines the need to compensate for thickness variations.

SUMMARY OF THE INVENTION

The present system is comprised of a measuring device to measure the thickness of the strip stock. The measuring device preferably consists of one or more measuring probes placed in a stamping die, which in turn is installed in a stamping press, to measure the strip stock thickness during the stamping process. The measuring probes can be linear variable differential transducers, analog proximity sensors, or optical sensors. The system also includes a controller which receives the output from the measuring device, and calculates the thickness variation over time. The controller either monitors and reports these variations or provides the die with appropriate instructions for correcting the thickness variation during the stamping process.

The output from the measuring device is inputted into the die controller, which utilizes the sensed thickness measurement value based on the desired dimensions and configuration of the lamina being formed with respect to the predetermined parameters of the final part. For example, when used with conventional punch press machines, the need to rotate the individual lamination with respect to the laminated stack can be accurately determined in order to overcome parallelism error. Alternatively, the depth of a compensating dimple to be formed on one side of the lamina can be automatically adjusted so as to provide a final laminated part having the desired height dimensions. In addition to being used as a controller input for the operation of the punch press, the present invention can act as a warning mechanism in any die controller in the event that it determines the tolerance of the strip stock has been exceeded, allowing an operator to stop the manufacturing process and thereby prevent the manufacture of parts which may otherwise be of inferior quality.

The objects and advantages of the invention will become apparent from the following description of certain present preferred embodiments taken in conjunction with the attached drawings and the appended claims.

BRIEF DESCRIPTION OF THE DRAWINGS

FIG. 1 consisting of FIGS. 1A and 1B are exaggerated enlarged fragmentary elevational views of a prior art conventional stack of laminas having variations in their transverse or nominal thickness.

FIG. 6, consisting of FIGS. 6A and 6B, are enlarged representations of the measuring device shown in FIGS. 4 and 5, respectively.

FIG. 8, consisting of FIGS. 8A, 8B and 8C, are top elevational views of typical laminations formed in accordance with the present invention.

DETAILED DESCRIPTION OF THE PREFERRED EMBODIMENT

The preferred embodiments disclosed herein relate to a method and apparatus for measuring material thickness within the confines of the stamping die. Applications of this apparatus include, but are not limited to, the manufacturing of laminated parts from a plurality of laminas. The laminas for forming the laminated parts are blanked from strip stock material and are then stacked to form the laminated part. Such stacking of laminas to form laminated parts is generally well known.

As a general overview, compensating for parallelism requires the accurate measurement of the thickness of the strip stock that becomes the laminas at a first location of the strip and measuring the thickness of the strip at a second location. The first location is preferably a point along the front side of the strip and the second location is preferably a point along the rear side of the strip. Next, the lamina thickness and the difference between the thickness values at the first location and the second location are computed at points along the strip stock that will become each lamina. The sum of the thickness values and the sum of the thickness difference values between the first and second locations is then computed for successive measurements. Then, a protuberance or dimple is preferably provided in a lamina at one or more locations when the sum of the thickness difference values equals or exceeds some predetermined value.

The protuberances are provided on the laminas to compensate for the difference in thickness between one location or side of the laminas and another location. For example, when the sum of the measured difference values equals or exceeds a predetermined difference value and the thickness values at the rear of the strip forming the laminas are greater than the thickness values at the front of the strip, a protuberance is provided on the front of the lamina strip. Preferably, the protuberance has a depth equal to the predetermined difference value.

Although the present invention is described as used in conjunction with a stamping die which corrects for material thickness variations by selectively providing a protuberance on individual laminas, it will be readily understood by those skilled in the art that the present invention can be used with a stamping die having means for rotating individual laminations and/or the lamination stack as taught by Neuenschwander, U.S. Pat. No. 4,619,028.

Figure 2:
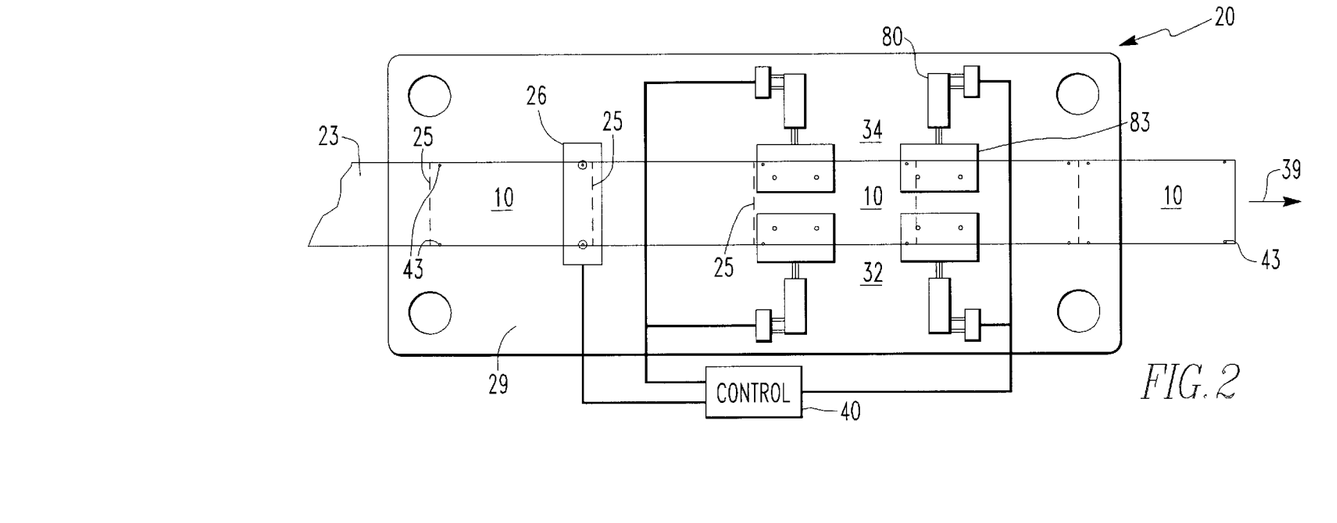
FIG. 2 is a schematic depiction of a punch press system and die controller having a material thickness sensing probe according to the present invention.
Figure 3:
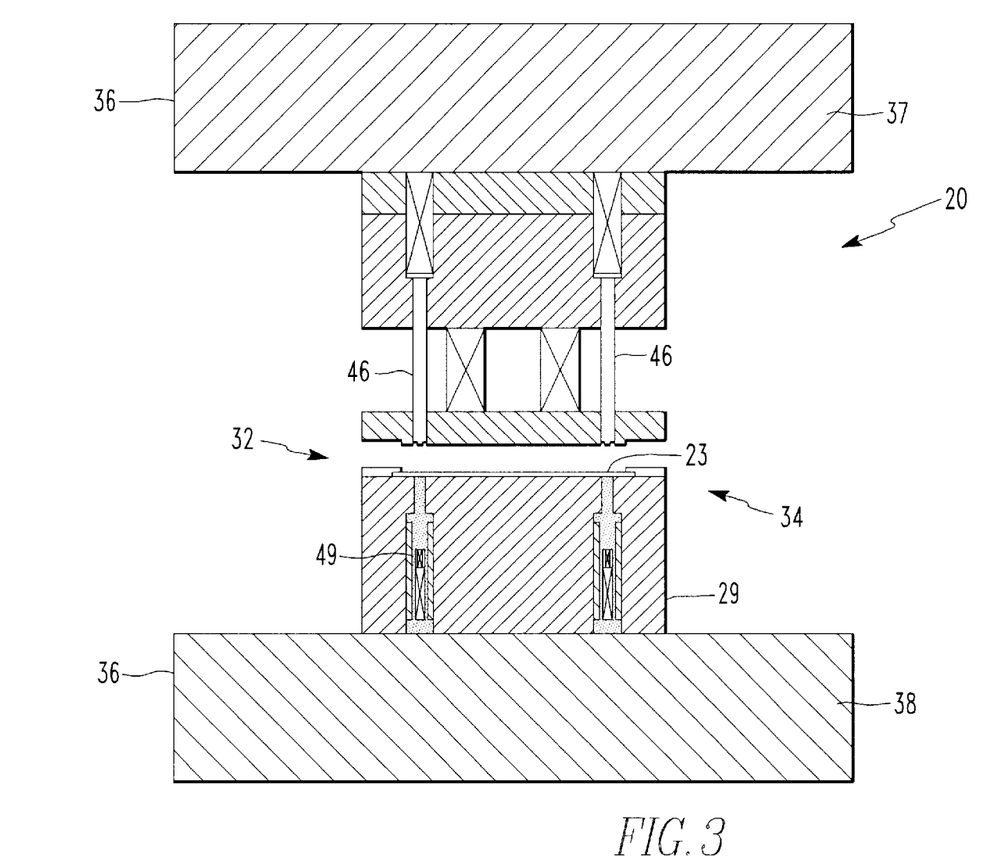
FIG. 3 is a cross-sectional view of the measuring device of the present invention in which the punches of the thickness sensor are shown in the retracted position.
Figure 6A:
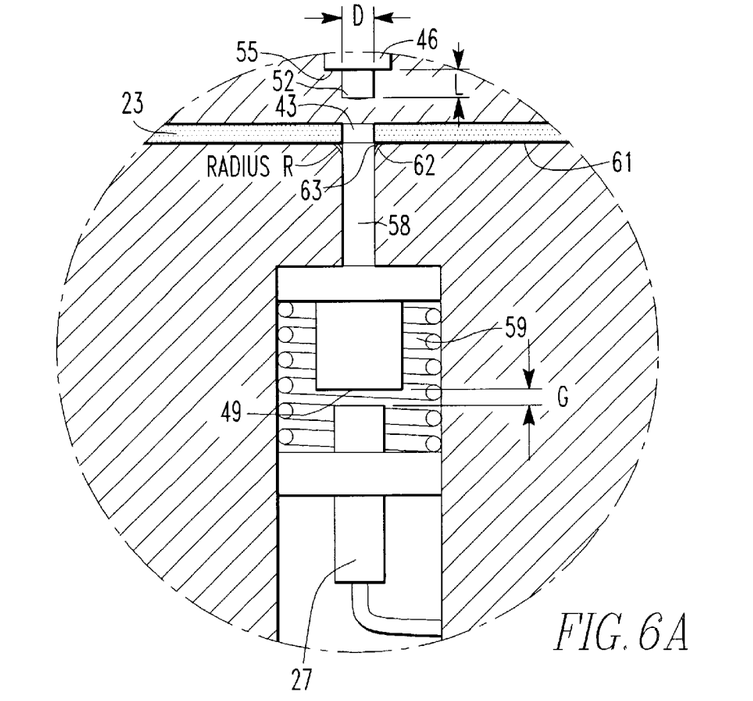
Figure 6B:
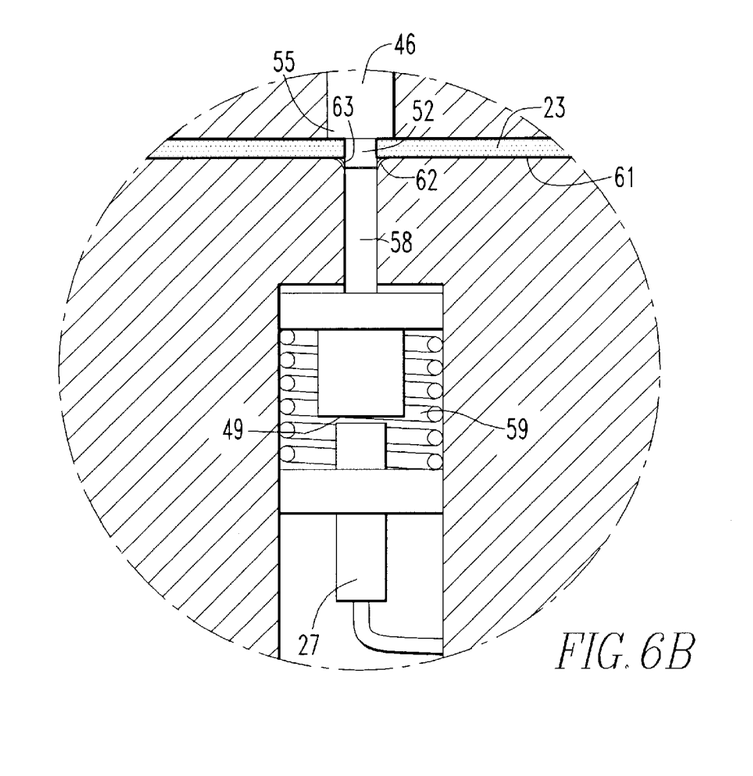

Referring to FIGS. 2 and 3, the strip stock 23 is depicted, wherein each individual lamination 10 is cut from the strip stock 23 once the pattern for that lamination is made on the strip stock as indicated by the dashed lines 25. The present invention includes a measuring device 26 to measure the thickness of the strip stock at a location of the stamping die 20, and preferably as near as possible to the lamination punching station. The measuring device 26 preferably consists of thickness measurement sensors 27 placed within the die shoe 29 on opposite sides of the strip stock, referred to herein as the "front" 32 and the "rear" 34 of the strip stock, prior to the stamping tool 36 (see FIG. 6).

Referring in detail to FIG. 3, a cross sectional view of the stamping die 20 and punch press 36 is shown to include an upper portion 37 as well as a lower portion 38. The strip stock 23 is also shown and would move toward the viewer viewing FIG. 3, as depicted by directional arrow 39 in FIG.

2. It is customary in the industry to designate the side of the stamping die 20 and the strip stock 23 indicated as reference numeral 32 as the "front" of the lamination stock 23 and stamping die 20. Likewise, it is also customary in the industry to designate the side of the stamping die 20 and the strip stock 23 indicated as reference numeral 34 as the "rear."

The punch press 36 also includes a controller 40 which receives the output from the measuring device 26 and determines an appropriate correction factor. The controller 40 is preferably a computer or Programmable Logic Controller. The controller 40 is preprogrammed to accept a value relating to the acceptable tolerance for the "lean" or parallelism of the lamination stack, as well as overall material thickness variations.

Figure 4:
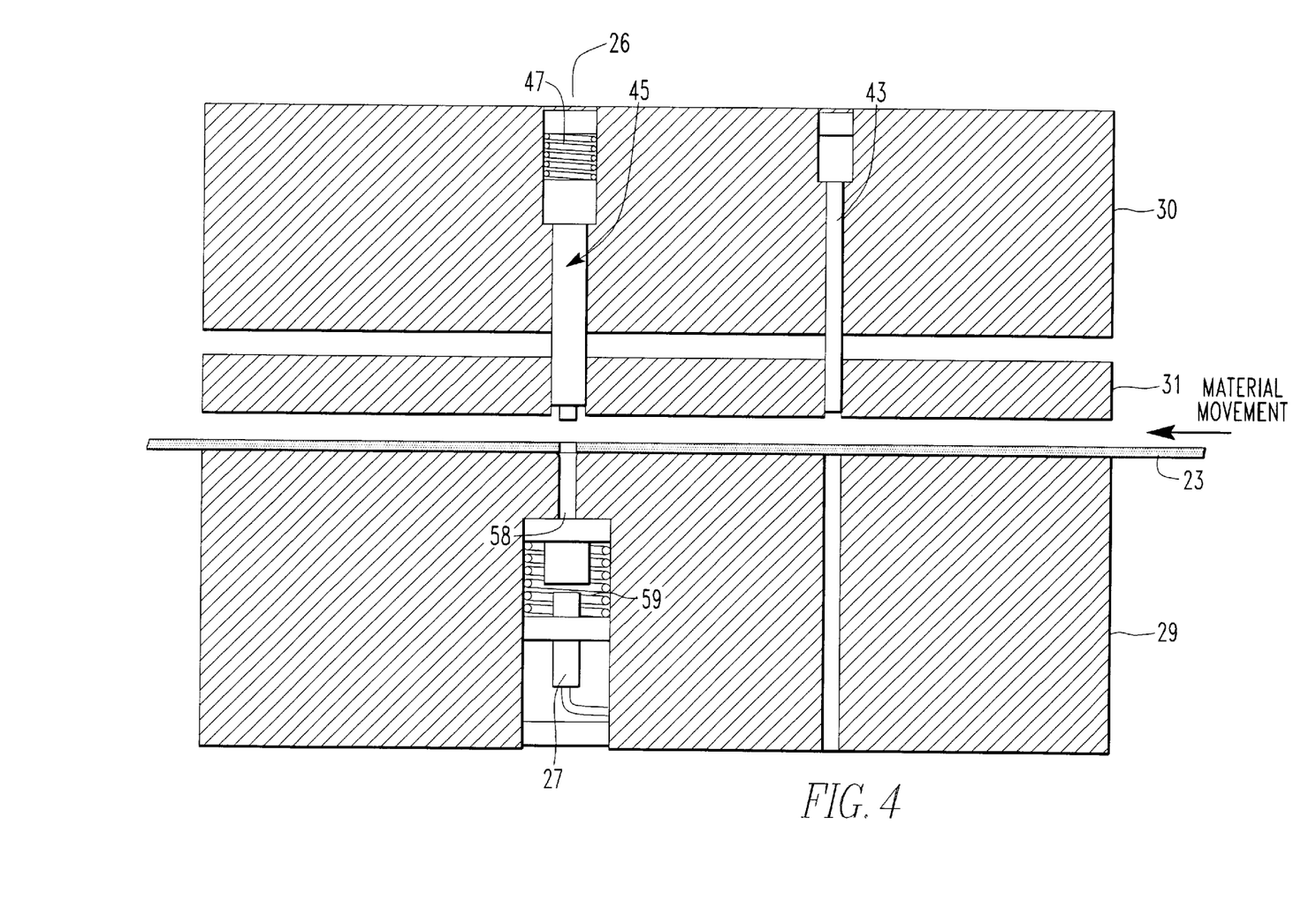
FIG. 4 is a detailed view of the die-mounted thickness measurement sensor of FIG. 3.
Figure 5:
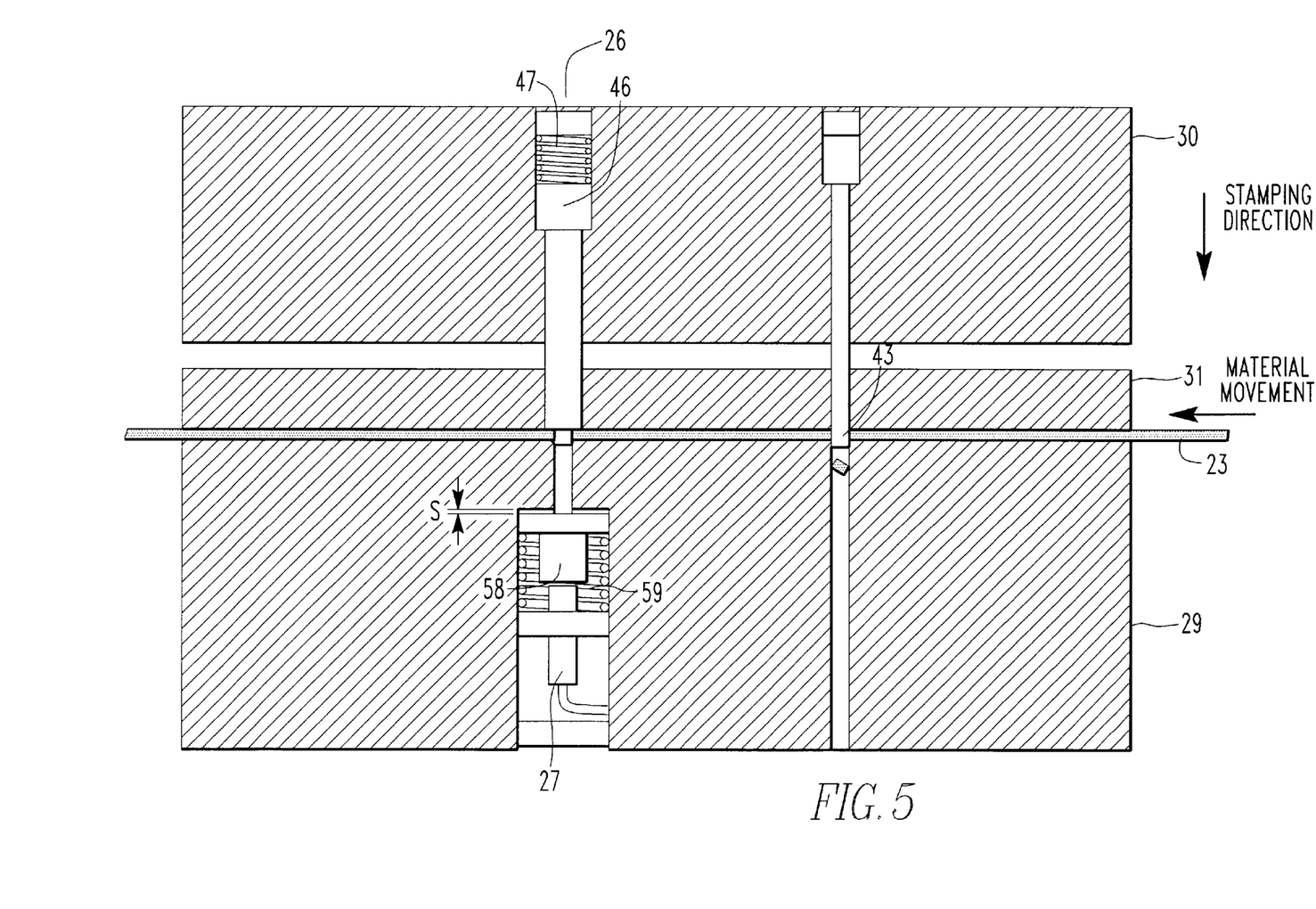
FIG. 5 is a detailed view of the measuring device of FIG. 4 during the measurement step.

Following is a detailed description of a device according to the present invention designed to provide improvements in material measurement at the stamping press and to survive in the stamping environment. As shown in FIGS. 4 and 5, the measuring device 26 is intended to fit within the confines of a stamping die lower portion or shoe 29 and punch upper portion or holder 30 with or without a stripper 31. The form and function of a stamping die is well known, and this device is applicable to all types, e.g. progressive, transfer, single hit, draw, form, blank, or etc. As part of a stamping die, it will utilize similar construction techniques that enable it to survive the harsh conditions listed previously.

In the stamping process, the strip stock material 23 is pierced at an early stage in the die. This piercing is usually a pilot hole 43 used for locating the strip stock relative to the tools in later stages as the strip progresses through the die. Other piercing for other purposes may also occur. For example, certain forms of strip stock are provided which already include a series of holes, and is referred to as "scrolled stock". While it is not absolutely necessary, a hole 43 in the strip stock 23 is the preferred method for accessing the metal thickness for measurement. Alternatively, the hole can be formed in the strip prior to its movement through the stamping tool. A measuring probe 45 is mounted in the upper (punch) portion 30 and the measurement sensor 27 in lower (die) portion 29 of the stamping tool 20. In applications where the front to back thickness differential is to be measured, two devices would be used. Preferably, the probe contained in the upper portion 30 is a spring loaded punch 46 and 47. In the lower portion is an electronic sensor 27 with an output that varies with its proximity to, or the movement by, a target 58 by means of contact with the target 58 or by measuring its proximity over air gap G. Examples of such a sensor are linear variable differential transducer (LVDT), analog proximity sensor or optical sensor. Preferably, the size of spring 47 and spring 59 is based on maintaining a ratio of 3:1 in force with spring 47 having the higher value. Spring forces of 10:1 greater than frictional forces is preferred.

When the stamping tool 20 closes, the lower portion of the punch 46 is shaped so that a projection 52 passes through the hole 43 in the strip stock 23. Its downward motion is stopped by a shoulder 55 that surrounds the projection, which shoulder contacts the top surface of the metal strip stock 23. Referring in particular to the enlarged detailed views shown in FIGS. 6A and 6B, the length L from the face of the projection 52 of the punch 46 to the shoulder 55 is known and is inputted to the controller 40. The lower or plunger portion 58 of the measuring device 26 is positioned in the die 29 below the metal strip and axially aligned with the punch 46. The projection 52 of the punch 46 activates the sensor 27 of the lower portion by either entering its sensing field or by moving plunger 58 towards sensor 27.

A radius 62 installed in die shoe 29 having a value of 1½ times the maximum burr 63 impressed on the stamping material 23 while piercing hole 43. Plunger 58 is installed to be substantially flush with the top 61 of the die shoe 29. As depicted in FIG. 5, the plunger 58 is displaced a distance S by punch 46. Since the distance the projection 52 penetrates below the die surface is controlled by the material thickness T, measuring of the displacement indicates material thickness. Therefore, this distance S is equal to the length L of the projection 52 minus the stock thickness T when the shoulder 55 of punch 46 references on the surface of material 23, or T=L−S. Variations in that sensed distance would indicate changes in the material thickness.

Determining the thickness of the material 23 can be determined using Method I or Method II explained in detail below.

Method I—Projection 52 known

Controller 40 establishes an initial reading of sensor 27 while the stamping die 20 is positioned as depicted in FIG. 4. Once this value has been read, controller 40 stores the output value of sensor 27 having a thickness equal to the predetermined projection 52 of punch 46. During the stamping process as depicted in FIG. 5, the controller will again read the output of sensor 27 and calculate the material thickness as:

Material thickness T=projection 52−[(initial reading−current reading)*sensor gain]

Proper values for sensor readings, sensor gain and projection 52 are assumed.

EXAMPLE

| projection 52 = 0.1500" | initial reading = 8 volts |
|---|---|
| sensor output = 0–10 vdc | current reading = 1.04 volts |
| sensor gain = 0.01250"/volt | |

T=0.1500 inches−[(8 volts−1.04 volts)×0.0125 inches/volts]

T=0.0630 inches

Method II—Projection 52 not known

Controller 40 established an initial reading of sensor 27 while the stamping die 20 is positioned as depicted in FIG. 5 without stamping material 23 inserted into stamping die 20. The initial reading of sensor 23 will be equal to a material thickness of 0.0000" since shoulder 55 of punch 46 is resting on the face 61 of the die shoe 29. When material 23 is inserted into the stamping die 20 and again placed in the position depicted in FIG. 5, the material thickness T will be calculated as:

T=(current reading−initial reading)*sensor gain

EXAMPLE

| sensor output | 0–10 vdc | initial reading | 1.04 volts |
|---|---|---|---|
| sensor gain | 0.0125 inches/volt | current reading | 6.08 volts |

T=(6.08 volts−1.04 volts)*0.0125 inches/volt

T=0.0630 inches

Establishing an initial reading with a known material thickness T can be incorporated and calculated using Method I, except substitute projection 52 with known thickness T. This method will not be as accurate since it is not practical to measure the material thickness precisely in a stamping die.

If the sensor 27 is a laser sensor, the separation S from the sensor to the top 61 of the die would be a known value. Sensing how far F the projection 52 extends into the die 29 with respect to the sensor will determine the distance D the projection 52 extends into the die sensor opening (D=S−F). Since this is limited by the material thickness T, again the equation T=L−D determines the material thickness (or T=L+F−S).

The profile of the shoulder face, the face of projection 52 and the die opening could be contoured to enhance their function. The die opening 62 could contain a radius on the inner diameter to provide clearance for burred edges on the material, and the projection 52 could be contoured to displace oil or other surface contaminates. The projection face could be contoured to exaggerate the rate of change in an electromagnetic field, improving the sensitivity of an analog proximity sensor for example.

The output of the electronic sensor 27 is directed to a controller that incorporates software designed to improve the linearity and stability of the output signal in a manner well known in the art. The conditioned signal is then directed to other devices to display the value in a standard linear measurement form and/or provide a signal to an interactive die control designed for a specific purpose. A secondary use would be as a misfeed detector, since the absence of a measurement at the appropriate time would indicate that the material was obstructing the punch from entering the opening.

The measured thickness T is ultimately inputted to the controller 40, which stores any measured thickness variations. The laminated part manufacturing process is selectively controlled based upon differing thickness measurements to compensate for parallelism error and/or stacks of unacceptable height. The controller causes the stamping tool to provide protuberances, for example, to compensate for thickness variations to overcome parallelism errors as well as to provide a stack of laminations having the desired height.

In order to manufacture a stacked laminated part utilizing the present invention, the following steps are performed. The operator inputs into the controller the operating characteristics of the stamping tool, along with the desired dimensions of the laminated part and acceptable tolerance limits. As shown in FIG. 2, individual laminations are stamped from the strip stock material and are generally indicated by the dashed lines 25. The stamping tool operating characteristics include measuring probe length L, protuberance height and/or degree of rotation of individual laminas to overcome parallelism error and/or provide a skew angle for the part. Desired laminated part parameters include desired stack height; maximum acceptable parallelism error and nominal strip stock material thickness. If the strip stock material is scrolled, this information is also inputted. Otherwise a pilot hole for the measuring probe of the present invention is to be formed by the stamping tool during the lamina forming process.

Preferably, a measuring probe is provided along both the front and rear side of the strip stock material. In this manner, both parallelism error and actual stack height are kept within the acceptable tolerance parameters inputted into the controller. As the strip stock material is fed through the stamping tool, the measuring probes are inserted through the pilot holes, and the thickness of the strip stock material is measured along both the front and rear sides for each lamination which is to be stamped or formed from that section of the strip stock material. The measuring and stamping steps are repeated in order to form a lamination part from the stacked individual laminations.

The controller keeps a running total of the measured thickness values to determine any parallelism errors or anticipated deviations from the desired stack height. When the controller determines that a compensating step is necessary, the stamping tool is instructed by the controller to form dimples in the appropriate sections of strip stock material when forming a particular lamina. Alternatively, the controller may cause rotation of a specific lamina with respect to the stacked laminations, or vise versa, in order to compensate for any of these error conditions.

Figure 7:
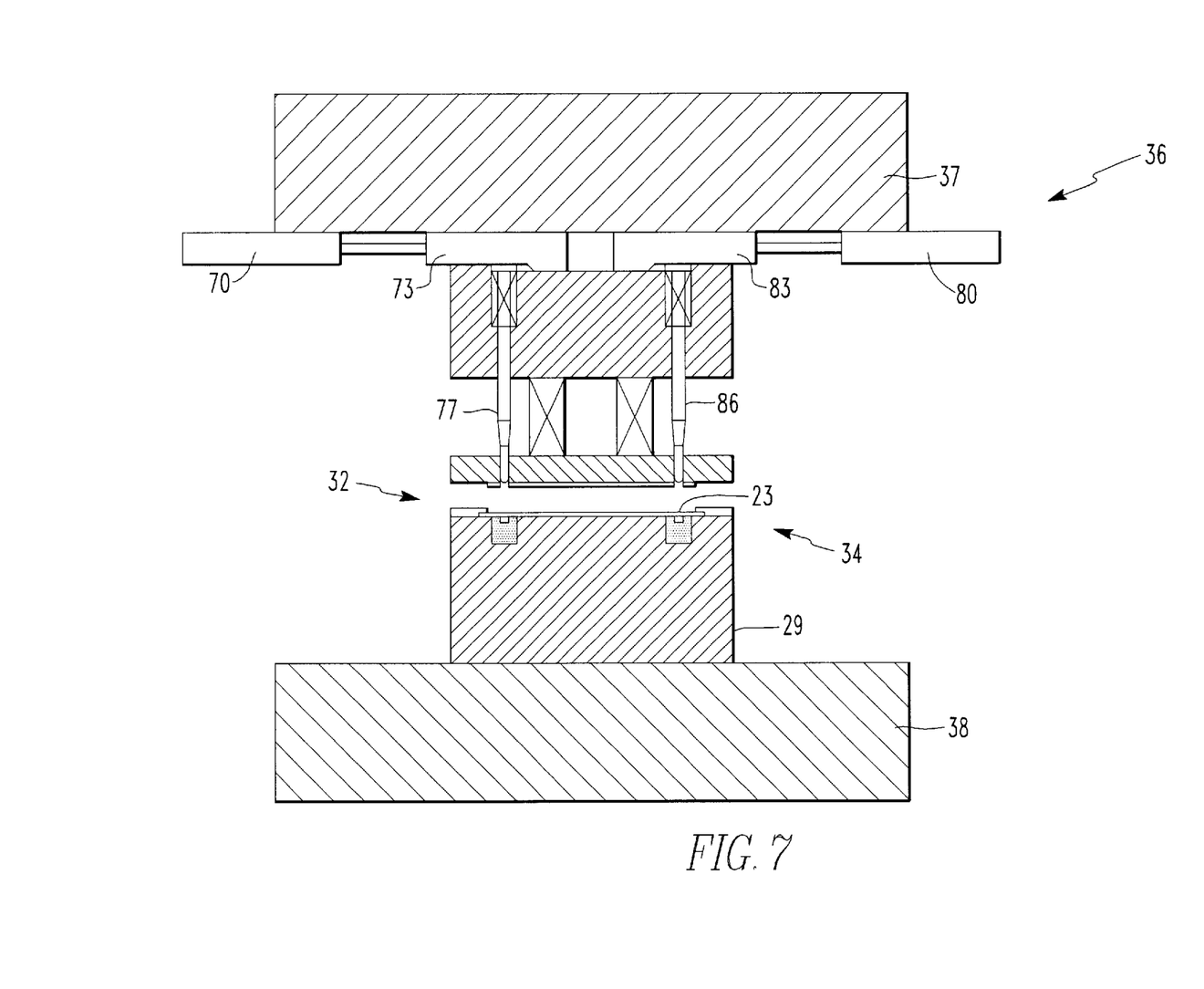
FIG. 7 is a cross-sectional view of a stamping tool used in a punch press system which may be used with the present invention for correcting parallelism error.

Referring now to FIG. 7, the die 20 further includes slide operated front and rear punches in a lamination stamping tool 36 and includes one or more front air valve and cylinders 70 oppressively connected to respective front actuating wedges 73 (two front air valve and cylinders 70 are shown in FIGS. 2 and 7, each oppressively connected to a respective front actuating wedge 73). The front air valve and cylinders 70 and the front actuating wedges 73, in combination, can actuate the front punches 77 to create a protuberance or protuberances upon the lamination stock 23, as will be described in greater detail below. The front air valve and cylinders 70 and the front actuating wedges 73 are oppressively connected to the controller 40 so that they can be actuated upon receipt of an appropriate signal from the controller 40. The front punches are sized, configured and positioned relative to the stamping tool so as to impress a protuberance upon the lamination stock 23 when appropriately actuated.

As can also be seen, the die 20 further includes one or more rear air valve and cylinders 80 oppressively connected to respective rear actuating wedges 83 (two rear air valve and cylinders 80 are shown in FIGS. 2 and 7, each oppressively connected to a respective rear actuating wedge 83). The rear air valve and cylinders 80 and the rear actuating wedges 83, in combination, can actuate the rear punches 86 to create a protuberance or protuberances upon the lamination stock 23, as will be described in greater detail below. The rear air valve and cylinders 80 and the rear actuating wedges 83 are oppressively connected to the controller 40 so that they can be actuated upon receipt of an appropriate signal from the controller 40. The rear punches are sized, configured and positioned relative to the stamping tool so as to impress a protuberance upon the lamination stock 23 when appropriately actuated.

A value representing the depth of the protuberance is available to the controller 40 as a fixed or variable function depending on the method used to establish the depth of the protuberance. If the depth of the protuberance is variable, another value representing the allowable gap or number of spacing per stack is entered. The differential thickness is added algebraically until the value equals or exceeds the height of the protuberance at which time the controller 40 sends a signal causing the slide operated punches 77 or 86 on the front 32 or rear 34 half of the strip stock 23 to extend.

The detailed operation of the stamping tool is described in the previously mentioned co-pending applications. When the predetermined differential value is met or exceeded by the sum of the differential values, as measured by the measuring device 26, a signal is sent by the controller 40 to the front set or the rear set of slide operated punches 77, 86.

Upon receipt of the signal from the controller 40, the punches 77, 86 are moved into the extended position. The slide operated punches are placed in the stamping tool 36 at an appropriate point in the progression so that when in the extended position, the punches 77, 86 will form protuberances selectively on the front or rear half of the lamination.

As is generally understood in the progressive die industry, the strip stock 23 is preferably indexed forward following each stroke of the stamping tool. Thus, successive sections of the strip stock are punched by a particular die.

Figures 8, 8A, 8B, 8C:
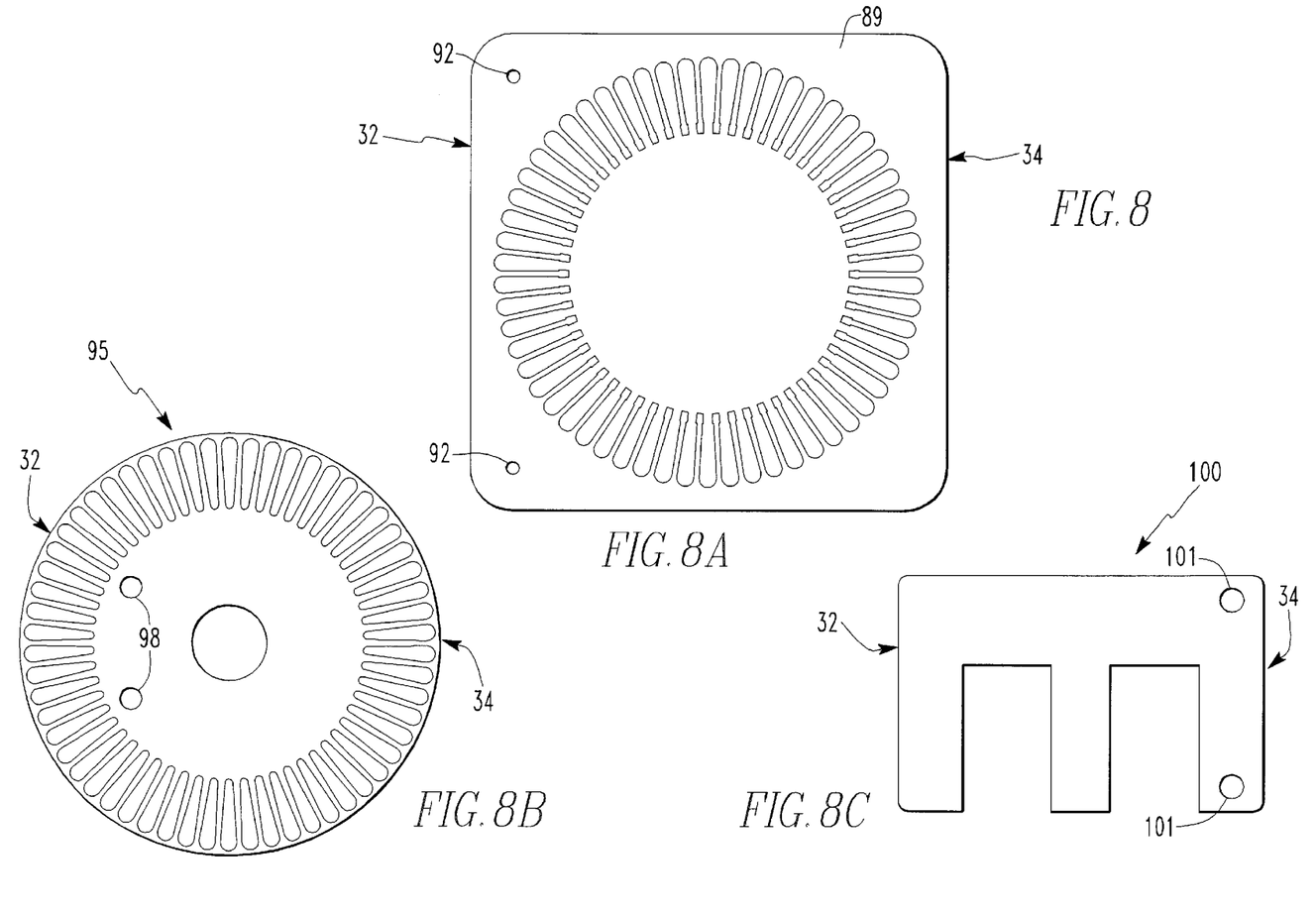

Examples of typical stamped, cut laminations are shown in the various examples of FIG. 8. The designations of the "front" and "rear" are maintained with respect to the laminations. In the example of FIG. 8A, the square lamination 89 includes two protuberances 92 disposed along the front 32 of the lamination 89. Thus, the strip stock from which the lamination 89 was formed had a relatively thinner front side 32 than a rear side 34. Referring in particular to the example of FIG. 8B, a circular lamination 95 is shown. Here, protuberances 98 are again provided on the front side 32 of the lamination 95. Referring next to the example in FIG. 8C, yet another lamination 98 is shown. The lamination 98 is not symmetrical. Nonetheless, the present invention may be employed with respect to asymmetrical laminations. In this example, protuberances 101 are provided on the rear side 34 of the lamination 100. Thus, the rear side 34 of the lamination is relatively thinner than the front side 32.

The punch press continuously performs these steps in order to provide a finished, stacked laminated part having the desired dimensions within the acceptable tolerance limits. Because the measured thickness values are precisely made according to the present invention, the desired manufactured dimensions of the laminated part can be more readily achieved.

Therefore, the present invention comprises a material thickness measuring device integral with a die. It provides an improvement over externally mounted devices in that it uses the inherent accuracy and rigidity of the die. Also, an externally mounted device requires floor space adjacent to the press machine, which may not always be available or practical due to manufacturing requirements. Thus, the present invention provides a die-mounted sensor for obtaining critical material thickness measurement dimensions for any type of stamping or punch press manufacturing operation.

While certain present preferred embodiments have been shown and described, it is distinctly understood that the invention is not limited thereto but may be otherwise embodied within the scope of the following claims.

What is claimed is:

1. A method of manufacturing laminated parts from a plurality of laminas, wherein the laminas for forming the laminated part are blanked from strip stock material and are then stacked to form the laminated part having defined stack parameters, the method comprising the steps of:

(a) providing a first pilot hole along a front side of said strip stock material and a second pilot hole along a rear side of said strip stock material;

(b) inserting a measuring probe into each of said first and second pilot holes to measure a thickness of said strip stock material along each of said front and rear sides;

(c) repeating the measuring step (b) for each of the laminas to determine a thickness difference value; and (d) selectively forming and stacking said individual laminas according to the measured thickness for each of the laminas to form a laminated part substantially according to the defined stacked parameters.

2. The method as recited in claim 1, wherein the step of compensating comprises forming one or more protuberances a selected one of said individual laminas based on the thickness difference value.

3. The method as recited in claim 1, wherein the step of compensating comprises rotating a selected one of said individual laminas with respect to the stacked laminas based on the thickness difference value.

* * * * *